United States Patent
Takahashi et al.

(10) Patent No.: US 6,214,962 B1
(45) Date of Patent: Apr. 10, 2001

(54) PREPARATION OF ORGANOPOLYSILOXANE GUM

(75) Inventors: Masaharu Takahashi; Yutaka Hagiwara, both of Annaka; Minoru Igarashi, Usui-gun; Keiji Shibata, Annaka; Kenji Tawara, Annaka; Yoshio Tomizawa, Annaka, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/453,467

(22) Filed: Dec. 2, 1999

(30) Foreign Application Priority Data

Dec. 2, 1998  (JP) .................................................. 10-342828

(51) Int. Cl.$^7$ ............................... B29B 7/00; B29B 1/00; C08G 27/08
(52) U.S. Cl. ............................... 528/21; 528/23; 528/37; 366/301; 556/460
(58) Field of Search ........................... 366/301; 556/460; 528/37, 23, 21

(56) References Cited

U.S. PATENT DOCUMENTS

| 4,128,568 | 12/1978 | Büchner et al. . |
| 4,551,515 | 11/1985 | Herberg et al. . |
| 4,739,026 | * 4/1988 | Reiderer et al. . |

FOREIGN PATENT DOCUMENTS

| 0 492 662 | 7/1992 | (EP) . |
| 1 174 219 | 12/1969 | (GB) . |
| 60-202124 | 10/1985 | (JP) . |

OTHER PUBLICATIONS

Patent Abstracts of Japan vol. 1999, No. 14, Dec. 22, 1999 &JP 11 246663 (Shin Etsu Chem Co. LTD Sep. 14, 1999.

* cited by examiner

Primary Examiner—Robert Dawson
Assistant Examiner—Kuo-Liang Peng
(74) Attorney, Agent, or Firm—Millen, White, Zelano & Branigan, P.C.

(57) ABSTRACT

An organopolysiloxane gum is continuously prepared by (I) mixing at least one cyclopolysiloxane with an end capping agent, (II) feeding the mixture to a self-cleaning reactor along with a polymerization catalyst of thermal decomposition type, and effecting polymerization at a temperature of 80–130° C., (III) heating the reaction mixture of step (II) at a temperature of 130–200° C. under subatmospheric pressure for deactivating the catalyst, thereby terminating the polymerization reaction, and (IV) continuously removing the cyclopolysiloxane and volatile components from the reaction product.

8 Claims, 1 Drawing Sheet

PREPARATION OF ORGANOPOLYSILOXANE GUM

This invention relates to a process for continuously preparing an organopolysiloxane gum which has a minimized content of hydroxyl in the terminal unit so that the gum is suitable in various silicone rubber compositions.

BACKGROUND OF THE INVENTION

Because of its improved characteristics including weather resistance, electrical properties, compression set, heat resistance, and low-temperature resistance, silicone rubber is widely used in a variety of fields including electronic equipment, automobiles, buildings, medical and food fields. Illustrative applications include rubber contacts used as rubber contact keys in remote controllers, type writers, computer keyboards, and musical instruments, building gaskets, rolls in copiers and printers (e.g., fixing rolls, developing rolls, transfer rolls, charging rolls, and paper feed rolls), vibration dampers in audio equipment, and compact disc packing in computers. As the demand for silicone rubber is increasing, the high productivity manufacture of silicone rubber at a low cost is desired.

The continuous preparation of organopolysiloxane is effective to meet such needs. JP-A 53-99300 corresponding to U.S. Pat. No. 4,128,568 discloses a process for continuously preparing a highly viscous organopolysiloxane in the presence of a basic and/or acidic reaction catalyst. It is described that viscous organopolysiloxanes having a viscosity of 10 to several millions of centipoises can be prepared, but no reference is made to organopolysiloxanes having a higher viscosity, that is, in the gum region. The catalysts used therein require a post-treatment for neutralization, which is cumbersome.

Another process for continuously preparing an organopolysiloxane gum is disclosed in JP-A 60-202124 corresponding to U.S. Pat. No. 4,551,515, which uses a neutralizing agent in a sufficient amount to neutralize the polymerization catalyst. This process is complicated and yields as a by-product the neutralization salt which must be disposed of and can have a detrimental influence on the product quality if left behind.

The terminal unit structure of organopolysiloxane depends on the structure of a terminal stopper used in the polymerization process. However, the process for preparing organopolysiloxane generally has the drawback that a trace amount of water in the reactant can also function as the terminal stopper. The resulting organopolysiloxane has hydroxyl groups introduced into the terminal unit, departing from the desired terminal unit. When such a high molecular weight organopolysiloxane gum having terminal hydroxyl groups is mixed with a reinforcing agent such as silica to formulate a silicone rubber compound, the compound gives rise to a crepe hardening phenomenon with the lapse of time because of the interaction between hydroxyl groups at the end of organopolysiloxane gum and hydroxyl groups on silica surface. Prior to use, the silicone rubber compound having undergone crepe hardening must be restored to the initial state by applying strong shear forces in a twin-roll mill or another kneader.

In the application where organopolysiloxane gum is used as a base component of a silicone rubber compound, it is desired to design the organopolysiloxane gum such that its terminal unit consists of a triorganosilyl group. Nevertheless, in the currently available gums, hydroxyl groups are introduced in the terminal unit owing to incidental factors as mentioned above. For the preparation of organopolysiloxane gum, it was needed to reduce the content of hydroxyl groups.

One process for reducing the hydroxyl group content is disclosed in the above-referred JP-A 60-202124. For removing a trace amount of water from the starting reactants such as a cyclopolysiloxane and a low molecular weight, linear organopolysiloxane as the terminal stopper, the reactants are previously dried using a desiccant such as molecular sieve. However, such pretreatment adds to the number of steps and renders the overall process complicated.

Another technique of reducing hydroxyl groups in organopolysiloxane terminal units is by adding a triorganohalosilane and a hexaorganodisilazane for neutralizing the alkali catalyst as disclosed in JP-A 60-49033 corresponding to U.S. Pat. No. 4,563,513. This technique is successful in reducing hydroxyl groups, but increases the number of steps and raises the problem of metal equipment corrosion due to the use of halosilane.

Therefore, for the preparation of organopolysiloxane gum (or organopolysiloxane having a high degree of polymerization), it is desired to have a more efficient technique capable of effectively reducing the content of hydroxyl groups in the terminal unit.

SUMMARY OF THE INVENTION

An object of the invention is to provide a novel and improved process for continuously preparing an organopolysiloxane gum having a minimized content of hydroxyl groups in the terminal unit and of consistent quality and low cost through simplified steps and in a highly productive manner.

The inventor has found that an organopolysiloxane gum can be continuously prepared by the steps of (I) mixing (A) at least one cyclopolysiloxane of the formula (1) to be defined below with (B) an end capping agent, (II) feeding the mixture of components (A) and (B) to a self-cleaning continuous polymerization reactor, continuously mixing (C) a polymerization catalyst of thermal decomposition type with the mixture, and effecting polymerization at a temperature of 80 to 130° C., and (III) heating the reaction mixture of step (II) at a temperature of 130 to 200° C. under subatmospheric pressure for deactivating the catalyst, thereby terminating the polymerization reaction. Since the reaction product resulting from step (III) contains the cyclopolysiloxane and volatile components as polymerization residues, step (III) is preferably followed by the step (IV) of continuously removing the cyclopolysiloxane and volatile components from the reaction product. In this way, an organopolysiloxane gum of consistent quality and substantially free of hydroxyl groups in the terminal unit can be prepared by a simplified process without a need for pretreatment and without a need for a cumbersome neutralization step. The organopolysiloxane gum can be prepared at a high productivity and low cost without concern about equipment corrosion.

Accordingly the invention provides a process for continuously preparing an organopolysiloxane gum, comprising the steps of:

(I) mixing (A) at least one cyclopolysiloxane of the following general formula (1):

wherein $R^1$ and $R^2$ are independently substituted or unsubstituted monovalent hydrocarbon groups, and n is an integer of at least 3, with (B) an end capping agent, (II) feeding the mixture of components (A) and (B) of step (I) to a self-cleaning continuous polymerization reactor, continuously feeding and mixing (C) a polymerization catalyst of thermal decomposition type with the mixture, and effecting polymerization at a temperature of 80 to 130° C., and (III) heating the reaction mixture of step (II) at a temperature of 130 to 200° C. under subatmospheric pressure for deactivating the catalyst, thereby terminating the polymerization reaction.

BRIEF DESCRIPTION OF THE DRAWINGS

The objects, features and advantages of the invention will be better understood by reading the following description taken in conjunction with the accompanying drawings.

DESCRIPTION OF THE PREFERRED EMBODIMENTS

Figure 1:
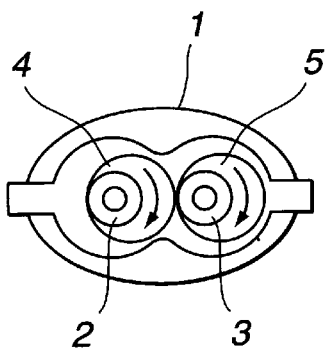
FIG. 1 is a schematic cross-sectional view of a self-cleaning reactor.

The process for continuously preparing an organopolysiloxane gum according to the invention starts with step (I) of mixing (A) at least one cyclopolysiloxane with (B) an end capping agent.

The cyclopolysiloxane (A) is of the following general formula (1):

wherein $R^1$ and $R^2$ are independently substituted or unsubstituted monovalent hydrocarbon groups, and n is an integer of at least 3. In formula (1), $R^1$ and $R^2$ are preferably substituted or unsubstituted monovalent hydrocarbon groups of 1 to 12 carbon atoms and especially 1 to 8 carbon atoms, for example, alkyl groups such as methyl, ethyl and propyl, alkenyl groups such as vinyl and allyl, aryl groups such as phenyl and tolyl, aralkyl groups such as phenylethyl, alkaryl groups, and substituted ones of these groups in which some or all of the hydrogen atoms are replaced by halogen atoms, cyano and other groups, such as chloromethyl, trifluoropropyl, cyanoethyl, and α-cyanophenylethyl. Preferably $R^1$ and $R^2$ are methyl, phenyl, vinyl or trifluoropropyl groups. Letter n is an integer of at least 3, preferably from 3 to 8, and most preferably equal to 4.

Illustrative examples of the cyclopolysiloxane of formula (1) include cyclized dimethylsiloxanes such as hexamethylcyclotrisiloxane and octamethylcyclotetrasiloxane, cyclized methylvinylsiloxanes such as tetramethyltetravinylcyclotetrasiloxane, cyclized diphenylsiloxanes such as octaphenylcyclotetrasiloxane, and cyclized methyltrifluoropropylsiloxanes such as trimethyltrifluoropropylcyclotrisiloxane. Of these, cyclized dimethylsiloxanes such as octamethylcyclotetrasiloxane are preferred because of the availability of starting reactants from which they are prepared. The use of cyclized dimethylsiloxanes in combination with cyclized methylvinylsiloxanes is also preferred from the standpoint of introducing alkenyl groups serving as the crosslinking site. These cyclic siloxanes may be used alone or in admixture of two or more. Preferred is a mixture of cyclic siloxanes containing at least 40%, and especially at least 60% of a cyclic compound wherein n=4.

The end capping agent (B) is used for stopping polymerization reaction for adjusting the weight average molecular weight of the resulting organopolysiloxane gum. Well-known chain stoppers including vinyl chain stoppers and trialkylsiloxy chain stoppers such as methyl chain stoppers are useful. Illustrative end capping agents are of the following formula (2).

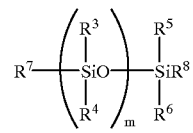

Herein, $R^3$ to $R^8$ are substituted or unsubstituted monovalent hydrocarbon groups and may be identical or different. The monovalent hydrocarbon groups represented by $R^3$ to $R^8$ are preferably those having the same number of carbon atoms as $R^1$ and $R^2$ in formula (1), with illustrative examples thereof being the same as listed above. In particular, $R^7$ and $R^8$ are preferably methyl or vinyl, especially vinyl. The letter m is an integer of 1 to 200, preferably 10 to 100, and more preferably 20 to 80. The end capping agents may be used alone or in admixture of two or more and selected in accordance with the end use of the final product. Of the foregoing stoppers, trialkylsiloxy chain stoppers such as methyl chain stoppers and alkenyl group-containing alkylsiloxy chain stoppers such as vinyl chain stoppers are preferably used.

The amount of the end capping agent used is preferably about 0.0001 to 10 parts, and more preferably about 0.0001 to 5 parts by weight per 100 parts by weight of the cyclopolysiloxane of formula (1).

In step (I), the cyclopolysiloxane (A) and the end capping agent (B) are mixed by any desired technique. If desired, the mixing of the cyclopolysiloxane (A) and the end capping agent (B) may be followed by pneumatic conveying using an inert gas such as nitrogen gas for the purposes of dehydrating both the components and removing carbon dioxide. Alternatively, the mixture may be dried using silica gel or molecular sieve.

Step (II) is to feed the mixture of components (A) and (B) resulting from step (I) to a self-cleaning continuous polymerization reactor, continuously feed (C) a polymerization catalyst of thermal decomposition type to the mixture, and effect polymerization at a temperature of 80 to 130° C. With respect to the operating pressure, the polymerization may be effected under subatmospheric pressure for removing water.

The polymerization catalysts of thermal decomposition type (i.e., thermally decomposable catalysts) are, for example, quaternary phosphonium hydroxides and ammonium compounds, and preferably phosphonium-containing organopolysiloxanes and ammonium-containing organopolysiloxanes. The phosphonium-containing organopolysiloxanes can be prepared by reacting quaternary phosphonium hydroxides such as n-tetrabutylphosphonium hydroxide, tetraphenyl-phosphonium hydroxide, and tetramethylphosphonium hydroxide with hexamethylcyclotrisiloxane. More specifically, n-tetrabutylphosphonium hydroxide and hexamethylcyclotrisiloxane are mixed in a weight ratio of 1:10 and reacted at a temperature of 40 to 45° C. and a pressure of 30 mmHg for about 10 to 20 hours. The reaction mixture is fully dehydrated until it becomes transparent. Reaction is further continued under a pressure of 20 mmHg for about 2 hours.

Similarly, the ammonium-containing organopolysiloxanes can be prepared by reacting quaternary ammonium hydroxides such as tetramethylammonium hydroxide and tetraphenylammonium hydroxide with hexamethylcyclotrisiloxane. More specifically, in one preferred method, quaternary ammonium hydroxide and hexamethylcyclotrisiloxane are mixed in a weight ratio from 1:100 to 1:5 and reacted at a temperature of 40 to 60° C. and a pressure of 1 to 200 mmHg for about 1 to 10 hours.

The polymerization catalyst of thermal decomposition type (C) is preferably used in an amount of 1 to 1,000 parts, especially 10 to 500 parts by weight per million parts by weight of components (A) and (B) combined. Less than 1 ppm of the catalyst may be insufficient to promote polymerization. More than 1,000 ppm of the catalyst can probably cause difficult removal of the residual compounds or adversely affect the appearance, odor, heat resistance and crosslinking characteristics of the resulting siloxane gum.

The self-cleaning continuous polymerization reactor used in step (II) is a self-cleaning reactor (SCR) or N-SCR, both commercially available from Mitsubishi Heavy Industries K.K., for example. Referring to FIG. 1, an SCR is illustrated as comprising a generally cylindrical container 1 defining a "8"-shaped cross section interior in which two shafts 2 and 3 rotating in the same direction are juxtaposed. Each of the rotating shafts 2 and 3 is provided with a plurality of helically arranged eccentric thick disks 4 and 5. Each rotating shaft forms a rotor with the plural eccentric disks. As the two shafts 2 and 3 rotate at an equal speed, the outer peripheries of the paired rotors, the side surfaces of the disks on the juxtaposed shafts, and the outermost periphery of each rotor and the inner wall of the container move at a relative speed whereby all the surfaces within the container are completely cleaned. See Mitsubishi Heavy Industries Technical Report, vol. 24, No. 2, March 1987. The reactants are admitted into the container from one end thereof, longitudinally moved while being agitated by the rotors within the container, during which period polymerization reaction takes place, and then discharged from the other end of the container. The arrangement of disks is not limited to the helical arrangement and may be changed as desired.

The polymerization in the self-cleaning reactor must be effected at a temperature of 80 to 130° C., and preferably 100 to 120° C. Most often, heat release starts at the same time as the onset of polymerization. The polymerization time is not critical although it is about 0.01 to about 2 hours.

In step (III) according to the invention, the reaction product resulting from step (II) is heated under subatmospheric pressure, preferably a reduced pressure of up to 500 mmHg, more preferably up to 100 mmHg and at a temperature of 130 to 200° C., preferably 140 to 180° C. for fully deactivating the catalyst. Step (III) yields an organopolysiloxane gum of consistent quality having a minimized hydroxyl content in the terminal unit and a high degree of polymerization. The time required for step (III) is preferably about 0.1 to 10 hours, and more preferably about ½ to 2 hours.

As opposed to the conventional step of thermally deactivating the polymerization catalyst of thermal decomposition type under atmospheric pressure or slightly higher pressure, the present invention carries out the thermal deactivation step under a reduced pressure below atmospheric pressure for thereby effectively accomplishing the deactivation of the polymerization catalyst and simultaneously removing the water content from the reaction system. If the pressure during the heating step is at or above atmospheric pressure, the water content cannot be fully removed, which allows for formation of hydroxyl groups in the terminal units, failing to achieve the objects of the invention. If subatmospheric pressure is employed only in the polymerization step (II), it is impossible to remove hydroxyl groups which can be introduced into the terminal unit as a result of deactivation of the polymerization catalyst of thermal decomposition type, failing to achieve the objects of the invention.

Step (III) may be done in the same self-cleaning reactor as step (II) without transfer or use a separate processor, typically extruder. A single, twin or multiple screw extruder with a vent is preferably used as well as another continuous processing machine. A processor with a thin-film or thin-wire degassing means is especially desirable.

The thus obtained organopolysiloxane gum is ready for use. However, since low volatiles such as low molecular weight siloxanes and decomposed products of the catalyst remain in the organopolysiloxane gum product, a desirable practice is to remove the low volatiles from the organopolysiloxane gum before the gum is used. It is thus recommended that step (III) is followed by step (IV) of continuously removing the cyclopolysiloxanes and volatile components remaining in the polymerization reaction product as polymerization residues.

Step (IV) preferably uses single, twin and multiple screw extruders as well as other continuous processors. The processor provided midway or downward with a vent or a thin-film or thin-wire degassing means is preferred for continuously removing the cyclopolysiloxanes and volatile components remaining as polymerization residues.

Step (IV) is generally effected at a temperature of 150 to 250° C. and at or below atmospheric pressure. Since a lower operating pressure is desirable, step (IV) is preferably designed so that evacuating operation can be carried out if necessary. By conducting step (IV), the content of low molecular weight siloxanes and decomposed products of the catalyst in the organopolysiloxane gum can be minimized. The contents of nitrogen and phosphorus atoms resulting from decomposition of the catalyst are desirably low. Specifically, a nitrogen atom content of up to 1 ppm and a phosphorus atom content of up to 15 ppm are desirable.

According to the process of the invention, there is obtained an organopolysiloxane gum having an average degree of polymerization of at least 3,000 and especially at least 4,000. The upper limit of the average degree of polymerization is not critical although it is usually 30,000 or less.

The organopolysiloxane gum thus obtained has terminal units substantially all of which are blocked with triorganosilyl groups originating from triorganosilyl groups at the ends of the low molecular weight, linear organopolysiloxane. That is, the gum has a minimized terminal hydroxyl content.

The gum also has a relative viscosity ratio of up to 1.10, and especially up to 1.05, which is defined later.

EXAMPLE

Examples of the invention are given below by way of illustration and not by way of limitation.

Example and Comparative Example

Figure 2:
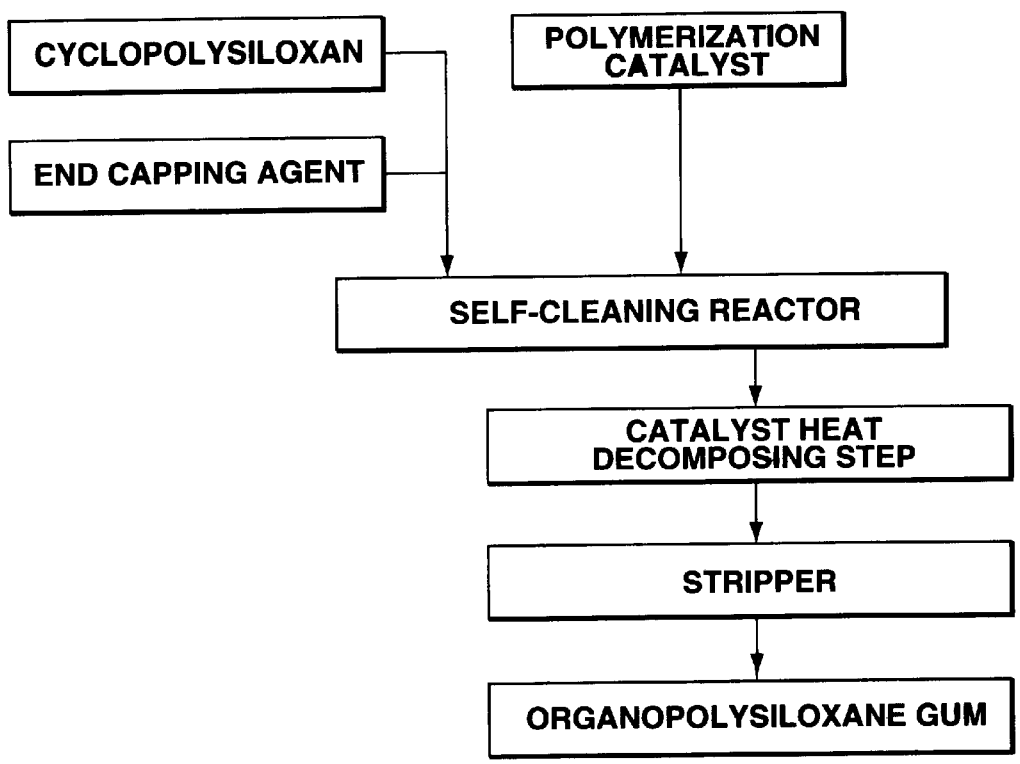
FIG. 2 is a diagram showing the continuous preparation process of the invention.

In an experimental continuous process system as shown in FIG. 2, organopolysiloxane gums were continuously produced using the reactants and conditions shown in Table 1. The organopolysiloxane gums obtained were measured for rubber properties, with the results being also shown in Table 1.

The reactants, cyclopolysiloxanes and end capping agent and the polymerization catalyst were continuously pumped by constant rate gear pumps. The self-cleaning continuous polymerization reactor used in step (II) was SCR by Mitsubishi Heavy Industries K.K. The extruder used in step (III) was KRC commercially available from Kurimoto Iron Works K.K. Step (IV) of removing low molecular weight siloxanes from the polymerization product was carried out by means of a thin-wire falling-film stripper.

TABLE 1

|  | E1 | E2 | CE1 | E3 |
|---|---|---|---|---|
| Cyclopolysiloxane feed rate (kg/H)*[1] | 30 | 30 | 30 | 30 |
| Vinyl terminal stopper feed rate (kg/H)*[2] | 0.17 | 0.17 | 0.17 | 0.17 |
| Polymerization catalyst: |  |  |  |  |
| TMAH siliconate (kg/H)*[3] | — | — | — | 0.05 |
| TBPH siliconate (kg/H)*[4] | 0.05 | 0.05 | 0.05 | — |
| Water content in reactants (ppm) | 110 | 100 | 90 | 100 |
| Step (II) or polymerization |  |  |  |  |
| Reactor residence time (min) | 20 | 20 | 20 | 20 |
| Pressure during polymerization (mmHg) | atmospheric | atmospheric | atmospheric | atmospheric |
| Polymerization temperature (° C.) | 110 | 110 | 110 | 110 |
| Step (III) or catalyst decomposition |  |  |  |  |
| Temperature during decomposition (° C.) | 150 | 150 | 150 | 180 |
| Pressure during decomposition (mmHg) | 200 | 50 | atmospheric | 100 |
| Decomposition time (min) | 30 | 30 | 30 | 30 |
| Step (IV) or low molecular weight siloxane removal |  |  |  |  |
| Temperature (° C.) | 200 | — | 200 | 200 |
| Pressure (mmHg) | 2 | — | 2 | 2 |
| Characteristics of product gum |  |  |  |  |
| Number average molecular weight | 600,000 | 630,000 | 180,000 | 590,000 |
| Average degree of polymerization | 7,900 | 8,300 | 2,300 | 7,800 |
| Residual N (ppm)*[5] | ≦1 | ≦1 | ≦1 | ≦1 |
| Residual P (ppm)*[6] | 10 | 10 | 10 | ≦1 |
| Relative viscosity ratio*[7] | 1.03 | 1.01 | 1.29 | 1.02 |
| Remarks | gum | gum | Low degree-of-polymerization gum, tacky | gum |

*[1] a mixture of dimethylcyclosiloxanes of the following formula wherein n is 3 to 7, containing about 70% of the dimethylcyclosiloxane with n = 4

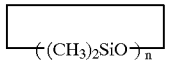

*[2] linear dimethylpolysiloxane end-blocked with a dimethylvinylsiloxy group and having a viscosity of 60 centistokes at 25° C.

TABLE 1-continued

|  | E1 | E2 | CE1 | E3 |
| --- | --- | --- | --- | --- |

$$CH_2=CHSi(CH_3)_2-O-[Si(CH_3)_2O]_p-Si(CH_3)_2CH=CH_2$$

Letter p is such a number as to provide a viscosity of 60 centistokes at 25° C.
*³TMAH siliconate: dimethylpolysiloxane containing 3% tetramethylammonium group
*⁴TBPH siliconate: dimethylpolysiloxane containing 10% tetrabutylphosphonium group
*⁵Nitrogen in the gum was converted into ammonia, the amount of which was measured by neutralization titration.
*⁶The phosphorus concentration in the gum was measured by atomic absorption spectroscopy.
*⁷The relative viscosity ratio was determined as follows.

The organopolysiloxane gum, 10 g, was dissolved in 90 g of toluene. To this toluene solution were added 0.5 g of tetramethoxysilane and several droplets of tetrapropyl titanate. The viscosity of this solution was measured at the initial and after one hour. The viscosity after one hour was divided by the initial viscosity to give a relative viscosity ratio. A relative viscosity ratio approximate to 1 means that because of the substantial absence of hydroxyl groups in the organopolysiloxane gum, little condensation reaction took place between methoxy groups on tetramethoxysilane and hydroxyl groups, resulting in little viscosity change.

As is evident from Table 1, an organopolysiloxane gum of consistent quality having a minimized hydroxyl content in the terminal unit and a high degree of polymerization can be prepared in a simple, efficient, continuous manner without a need for complex dehydrating pretreatment of reactants and neutralization step as required in the prior art.

There has been described a process for continuously preparing an organopolysiloxane gum of consistent quality having a minimized hydroxyl group content in the terminal unit and a high degree of polymerization at a high productivity and a low cost.

Japanese Patent Application No. 10-342828 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for continuously preparing an organopolysiloxane gum, comprising the steps of:

(I) mixing (A) at least one cyclopolysiloxane of the following general formula (1):

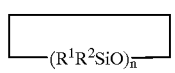

(1)

wherein $R^1$ and $R^2$ are independently substituted or unsubstituted monovalent hydrocarbon groups, and n is an integer of at least 3, with (B) an end capping agent, (II) feeding the mixture of components (A) and (B) of step (I) to a self-cleaning continuous polymerization reactor, continuously feeding and mixing (C) a polymerization catalyst of thermal decomposition type with the mixture, and effecting polymerization at a temperature of 80 to 130° C., and (III) heating the reaction mixture of step (II) at a temperature of 130 to 200° C. under subatmospheric pressure for deactivating the catalyst, thereby terminating the polymerization reaction.

2. The process of claim 1 wherein the polymerization catalyst of thermal decomposition type is a phosphonium-containing organopolysiloxane or an ammonium-containing organopolysiloxane or both.

3. The process of claim 1 wherein the subatmospheric pressure in step (III) is up to 500 mmHg.

4. The process of claim 3 wherein the subatmospheric pressure is up to 100 mmHg.

5. The process of claim 1 wherein step (III) uses an extruder separate from the reactor in step (II).

6. The process of claim 1 wherein the reaction product resulting from step (III) contains the cyclopolysiloxane and volatile components as polymerization residues, said process further comprising the step of:

(IV) continuously removing the cyclopolysiloxane and volatile components from the reaction product.

7. The process of claim 1 wherein the cyclopolysiloxane of formula (1) contains at least 40% of a cyclic compound wherein n=4 in formula (1).

8. The process of claim 1 wherein the end capping agent is of the following formula (2):

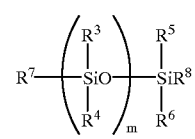

(2)

wherein $R^3$ to $R^8$ are substituted or unsubstituted monovalent hydrocarbon groups and may be identical or different, and letter m is an integer of 1 to 200.

* * * * *